No. 11,715.
Reissued Feb. 7, 1899.
W. A. HILL.
KNIFE SHARPENER.
(Application filed Jan. 6, 1899.)
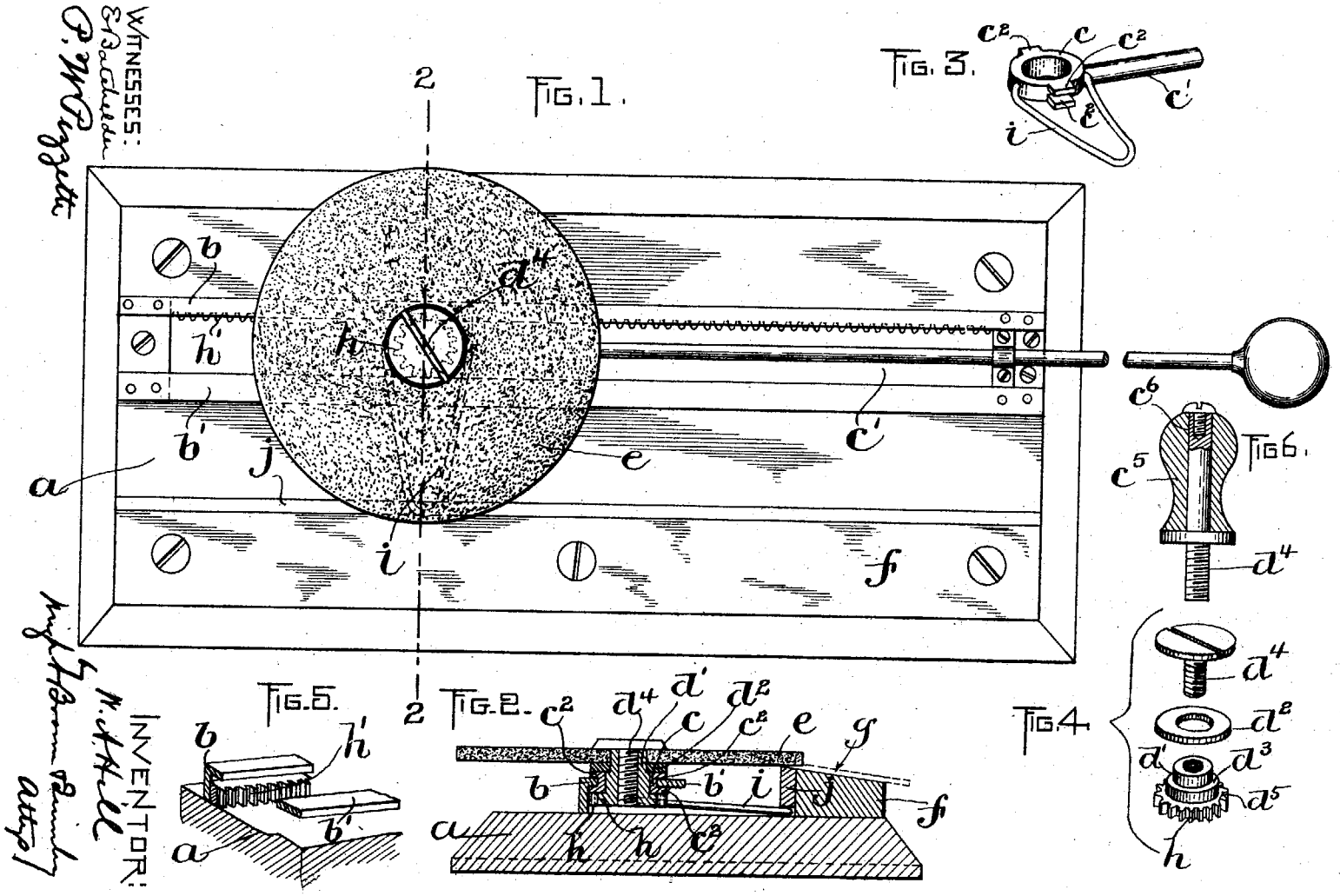
WITNESSES:
E. Batchelder
P. W. Pizzette
INVENTOR:
W. A. Hill
by Brown & Brinkley
Attys
THE NORRIS PETERS CO., PHOTO-LITHO., WASHINGTON, D. C.

UNITED STATES PATENT OFFICE.

WILFORD A. HILL, OF WALTHAM, MASSACHUSETTS, ASSIGNOR OF ONE-HALF TO J. C. MILLER, OF MELROSE, MASSACHUSETTS.

KNIFE-SHARPENER.

SPECIFICATION forming part of Reissued Letters Patent No. 11,715, dated February 7, 1899.

Original No. 611,686, dated October 4, 1898. Application for reissue filed January 6, 1899. Serial No. 701,432.

*To all whom it may concern:*

Be it known that I, WILFORD A. HILL, of Waltham, in the county of Middlesex and State of Massachusetts, have invented certain new and useful Improvements in Knife-Sharpeners, of which the following is a specification.

This invention has for its object to provide a simple and efficient knife-sharpener whereby a person not possessed of special skill as a grinder may satisfactorily sharpen a knife.

The invention consists in the improvements which I will now proceed to describe and claim.

Of the accompanying drawings, forming a part of this specification, Figure 1 represents a top plan view of a knife-sharpener embodying my invention. Fig. 2 represents a section on line 2 2 of Fig. 1. Fig. 3 represents a perspective view of the carrier for the grinding-wheel holder. Fig. 4 represents in separate views the parts of the grinding-wheel holder. Fig. 5 represents a perspective view showing parts of the carrier-guides. Fig. 6 represents a modification.

The same letters of reference indicate the same parts in all the figures.

In the drawings, *a* represents a supporting base or bed.

*b b'* represent parallel guides affixed to the base. *c* represents a carrier fitted to move back and forth on said guides and provided with an operating-handle, preferably extending parallel with the guides *b b'*, as shown in Fig. 1, where the handle is lettered *c'*. The carrier *c* is provided with ears or flanges $c^2$, formed to engage the guides, as shown in Fig. 2.

The carrier *c* is formed as a bearing, in which is journaled a grinding-wheel holder, which may be of any desired construction. As here shown, said holder comprises a cylindrical body *d*, formed externally to fit the interior of the carrier and turn freely therein and having a reduced upper portion *d'*, formed to enter an aperture in the center of the grinding wheel or disk *e*. The said wheel, which may be of emery, sandstone, or other suitable material, rests on a washer $d^2$, interposed between a shoulder $d^3$ on the holder and the under side of the wheel. A screw $d^4$, formed to engage a tapped orifice in the body *d*, clamps the wheel against the washer $d^2$, the wheel being thus rigidly secured to the holder, so that both rotate together. The body *d* has a shoulder or enlargement $d^5$ at its lower portion, which projects under the carrier *c* and prevents the holder and wheel from being raised from the carrier.

*f* represents a rest affixed to the base *a* at one side of the path in which the wheel-carrier is movable. Said rest has a knife-supporting face arranged to present one side of a knife-blade *g* to the under side of the grinding-wheel, said face being preferably slightly inclined, as shown in Fig. 2, to give the desired bevel to the portion of the blade on which the wheel acts.

Means are provided for rotating the wheel-holder and wheel while they are being moved back and forth on the guides *b b'*. As here shown, said means consist of a pinion *h*, affixed to the holder, and a rack *h'*, affixed to the base *a*, the rack meshing with the pinion. It will be seen, therefore, that the operator by moving the handle *c'* back and forth not only causes the grinding-wheel *e* to move back and forth over a blade supported by the rest, but also causes the rotation of the wheel at the same time, so that the wheel acts to rapidly grind the blade.

I prefer to provide means for maintaining a yielding pressure between the grinding-wheel and the knife to compensate for wear of the wheel and for the different thicknesses of the blade. To this end I provide for a limited vertical play of the carrier by making the space between the ears $c^2$ greater than the thickness of the guides *b b'* and providing the carrier with a spring *i*, which presses downwardly on the carrier and permits it to yield upwardly. The spring, as here shown, is a V-shaped piece of wire, attached at its ends to the carrier. The spring projects laterally from the carrier under the guide *b'*, which is raised from the bed to accommodate the spring. The outer end of the spring bears against a shoulder or guide *j*, affixed to the rest *f*, said guide holding down the spring and permitting it to move with the carrier. The spring therefore exerts a downward pressure on the carrier and normally presses the grinding-wheel against the rest when there is no blade on the latter, the spring yielding and permitting the wheel to be raised sufficiently to permit the insertion of a blade between it and the rest. It will be seen that the axis of rotation of the grinding-wheel is substantially at a right angle with the direction of movement of the carrier *c*, so that the progressive movement of the acting side of the wheel is parallel with the knife-rest, the said acting side maintaining a uniform relation to the knife-rest.

I do not limit myself to the details of construction here shown and described and may variously modify the same without departing from the spirit of my invention.

In Fig. 6 I show a modification in which the operating-handle projects upwardly from the wheel-holder and comprises a knob $c^5$, mounted loosely on a stud $c^6$, which is an extension of the screw $d^4$. When the knob $c^5$ is grasped by the operator and moved to move the grinding-wheel carrier, the stud $c^6$ rotates in the knob.

I claim—

1. A knife-sharpener comprising a supporting base or bed, parallel guides affixed to the bed, a carrier adapted to move on said guides and having a limited loose vertical motion thereon, a spring adapted to exert a yielding downward pressure on the carrier, a grinding-wheel holder journaled in the carrier, a grinding wheel or disk affixed to the holder, and a knife-rest adapted to present a knife to the under side of the wheel.

2. A knife-sharpener comprising a supporting base or bed, parallel guides affixed to the bed, a carrier adapted to move on said guides and having a limited loose vertical motion thereon, a spring attached to the carrier and projecting laterally therefrom, a fixed track or guide arranged to hold down the outer end of the spring, a holder journaled in the carrier, a grinding wheel or disk affixed to the holder, and a knife-rest adapted to present a knife to the under side of the wheel.

In testimony whereof I have signed my name to this specification in the presence of two witnesses.

WILFORD A. HILL.

Witnesses:
JOHN C. MILLER,
JOHN P. FOLEY.